Figure 1:
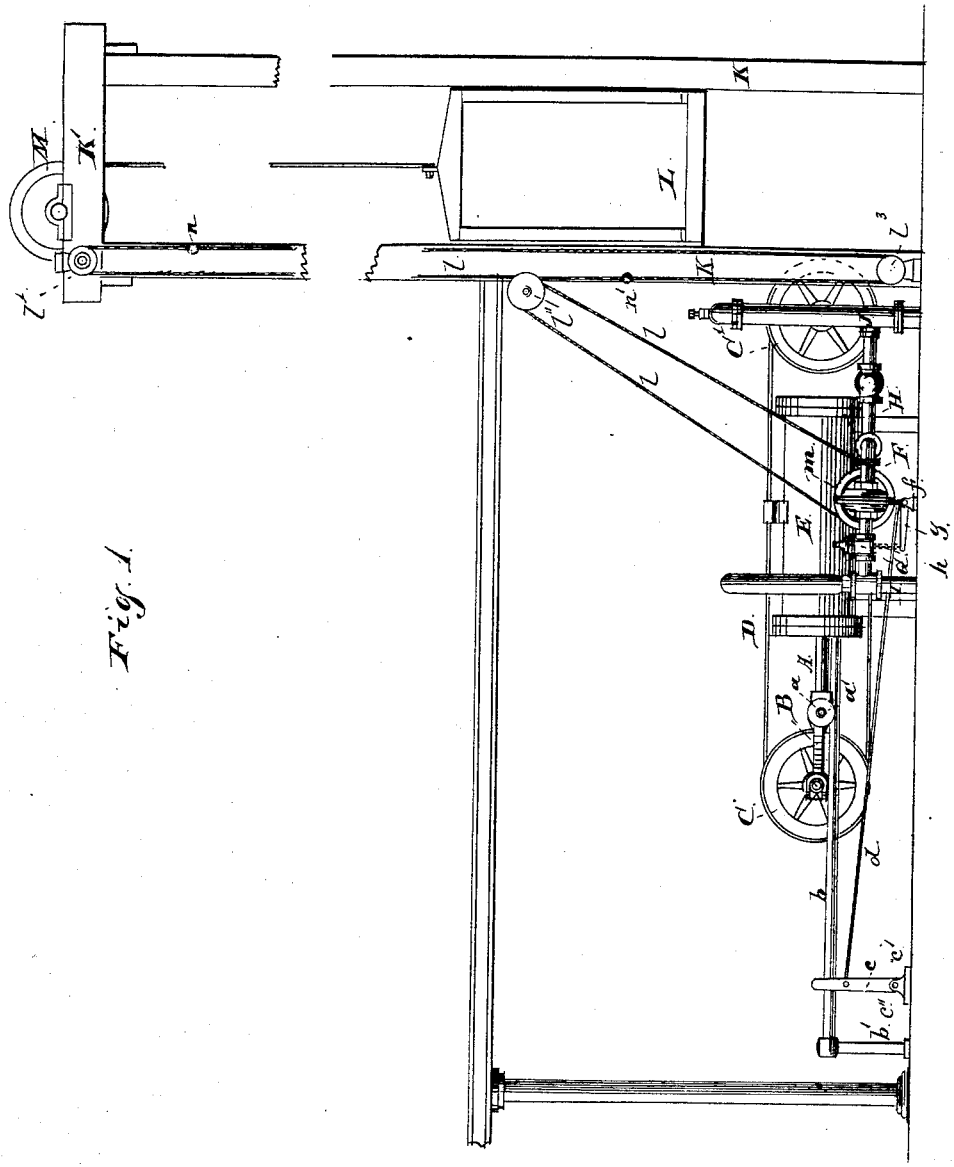

(No Model.) 2 Sheets—Sheet 1.

O. PUPIKOFER.
AUTOMATIC STOP FOR ELEVATORS.

No. 348,687. Patented Sept. 7, 1886.

Witnesses:
O. W. Bond.
B. A. Price.

Inventor:
Otto Pupikofer (No Model.) 2 Sheets—Sheet 2.
O. PUPIKOFER.
AUTOMATIC STOP FOR ELEVATORS.
No. 348,687. Patented Sept. 7, 1886.
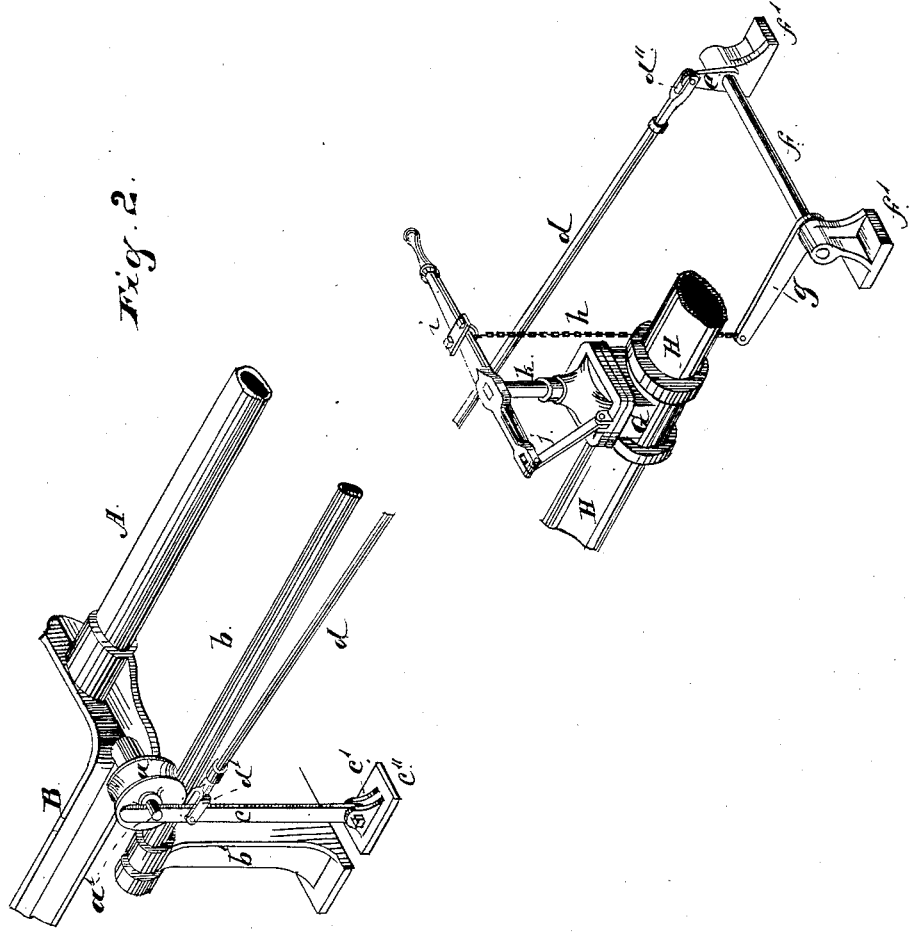
Witnesses:
O. W. Bond.
B. A. Price.
Inventor:
Otto Pupikofer

UNITED STATES PATENT OFFICE.

OTTO PUPIKOFER, OF CHICAGO, ILLINOIS, ASSIGNOR TO THE CRANE BROTHERS MANUFACTURING COMPANY, OF SAME PLACE.

AUTOMATIC STOP FOR ELEVATORS.

SPECIFICATION forming part of Letters Patent No. 348,687, dated September 7, 1886.

Application filed December 7, 1883. Serial No. 113,880. (No model.)

*To all whom it may concern:*

Be it known that I, OTTO PUPIKOFER, residing at Chicago, in the county of Cook and State of Illinois, and a citizen of the United States, have invented new and useful Improvements in Automatic Stops for Elevators, of which the following is a full description, reference being had to the accompanying drawings, in which—

Figure 1 is a side elevation showing one arrangement of the devices constituting the invention in relation to one form of hydraulic elevators; Fig. 2, a detail, being a perspective view showing the automatic stopping devices, a portion of the cross-head carrying the traveling-cable wheel, a portion of the piston of the cross-head, and a section of the water-supply pipe, the figure being broken at the center.

This invention is designed, primarily, for use in connection with that class of hydraulic elevators in which a water-pressure is made to act on a piston-head to operate a traveling cross-head carrying one of the cable-pulleys to give the required travel to raise and lower the cage, and has for its objects to stop the cage at the limit of the upward movement automatically in case the shifting-cable should become disarranged or broken, or the button-stop at the upper end of the shifting-cable should fail to perform its work from any cause; and its nature consists in providing a pivoted arm or lever operated from some moving part of the elevator, and connected by a link or rod with a rock-shaft provided with arms through which and a chain or other connection, what is known as a "Peet" or quick-moving valve will be operated and shut off the supply of water from the street-main or other source of supply, preventing the further movement of the traveling cross-head, as hereinafter more specifically described, and pointed out in the claims.

In the drawings, A represents the piston-rod; B, the cross-head attached to the upper end of the piston-rod; C, the pulley or grooved wheel carried by the cross-head B, and mounted in suitable bearings at the end of the side pieces or arms of the cross-head; C', the stationary pulley or grooved wheel for the operating cable; D, the operating cable; E, the cylinder inclosing the piston-head which drives the piston rod A; F, the shifting-valve for the cylinder E; G, a Peet or other quick-moving valve located on the supply-pipe between the source of supply and the shifting-valve; H, the supply-pipe for the cylinder; H', the discharge-pipe for the cylinder; I, the pipe leading from the supply-pipe H to the street-main or other source of supply; J, a siphon-relief valve of the ordinary and well-known construction, placed on the discharge-pipe to prevent the cables from dropping off the sheaves or wheels in case the cage becomes obstructed or stopped in its descent; K, guide-posts for the cage; K', cross-piece at the upper end of the guide-post K; L, the cage; M, the pulley or sheave on the cross-piece K', over which the cable travels.

The parts so far specified may be of the usual construction for such devices, and they may be arranged as shown in Fig. 1, or in any other of the usual forms of arrangement; and they are not here more specifically described, as they form no part of this invention, except in their relation to the devices for automatically stopping the upward movement of the cage at the limit of ascent, which devices constitute the main feature of the present invention.

The cross-head B is supported on a track-way by a grooved wheel or pulley on each side, and one of these wheels, $a$, has its spindle $a'$ made to project beyond the face of the wheel, as shown in Fig. 2. The track for the wheel $a$ may be made of gas-pipe or other suitable material, and this rail or track $b$ is supported at each end by a standard, $b'$, secured to the floor or other support. Adjacent to the rail or track $b$, and near the outer end thereof, is located an arm, $c$, the lower end of which, as shown, is pivoted between ears $c'$ on a plate or support, $c''$, and the upper end of which projects above the top of the rail, and in line to be engaged by the projecting spindle $a'$, and this lever or arm $c$ is located at the proper point in relation to the travel of the cage to be engaged by the travel of the spindle $a'$ as the cage reaches the limit of its upward movement. This arm or lever $c$ has attached thereto by a fork, $d'$, or otherwise, one end of a rod, d, the other end of which is attached by a fork, d'', or otherwise, to the end of an arm, e, on a rock-shaft, f, which shaft is supported in suitable bearings on standards or brackets f'. This rock-shaft f, at the end opposite to e, as shown, is provided with an arm, g, the two arms e and g standing at right angles to each other, or at such angle to each other as is required for the movement of the arm e to move the arm g the required distance to close the valve. The outer end of the arm g, as shown, has attached thereto one end of a chain, h, the other end of which is attached to an arm or lever, i, which arm or lever is attached to the upper end of the valve-stem k of the Peet or quick-moving valve, and one end of this arm or lever i is pivoted to the end of a rod, j, which rod is pivoted at its other end to the casing of the valve, as shown, so that the downward movement of the free end of the arm or lever i will push down the valve-stem k and close the valve.

The operation is as follows: The cross-head on its outward travel raises the cage or platform, and as this head reaches the limit of movement for the limit of elevation of the cage, the pin or spindle a' comes in contact with the end of the lever or arm c, and pushes the arm in the direction of movement of the cross-head, drawing the rod d forward, pulling down the arms e g, and, through the pin, drawing down the arm i and closing the valve, shutting off the further supply of water, thereby stopping further outward movement of the cross-head and further ascent of the cage. The arm c is to be located so as to be engaged by the pin or spindle a' in case the cage for any reason should continue ascending after it has reached its proper limit. By thus providing a limit-stop which acts directly on the supply-valve at the terminus of the upward movement of the cage, further upward movement will be prevented by reason of the stop acting and shutting off the water-supply, and by these means a stop is provided wholly independent in its action of the shifting-cable, and which will act automatically, as the point at which the elevator-cage should be stopped in its upward movement is reached, preventing further upward movement, and consequently injury or damage therefrom or thereby, and this stop being operative from the movement of the cross-head, and not from the shifting-cable, it will be evident that it will operate irrespective of the cable, so that in the event of the breaking or failure to operate of the cable from any cause the ascent of the cage beyond the point at which it should stop will be stopped, and in case the shifting-cable by use becomes lengthened so that the upper button-stop fails to perform its work at the proper instant, the movement of the cage will be stopped by the action of the valve-stop.

As shown, the valve-stop is operated from the movement of the cross-head, the connecting-rod lying horizontally; but it is evident that this rod could be arranged in a vertical position, and the arm or lever c be arranged at the top of the elevator-way, to be engaged by a suitable stop or projection on the cage, and be thrown up or down, as required, and through the arms e g and chain h shut the valve and stop the supply of water.

As shown, the stop is connected with a Peet or quick-moving valve; but the connection might be made with the shifting-valve, so as to operate that valve, to shut off the supply and open the discharge, and this connection might be made by connecting the end of the rod d directly with the stem of the shifting-valve, through an arm or lever, or otherwise, instead of interposing the rock-shaft and its arms.

The shifting-cable l is of the usual arrangement, running up and over a pulley, l', and down and under a pulley, l², and around an intermediate pulley, l'', from which pulley it passes around the shifting-wheel m, and this shifting-cable is provided with the usual stops or buttons, n n', located thereon at the proper points at the top and bottom.

What I claim as new, and desire to secure by Letters Patent, is as follows:

The pivoted arm c, rod d, rock-shaft f, arms e g, connection h, and lever i, connected to the valve-stem k and pivoted at one end to the pivoted arm j, in combination with the cross-head B, carrying pulleys a, traveling on suitable ways, and the spindle a', engaging with the pivoted arm c for automatically closing the valve, substantially as shown and described.

OTTO PUPIKOFER.

Witnesses:
O. W. BOND,
B. A. PRICE.